J. D. BREWER.
Fishways.

No. 154,216.  Patented Aug. 18, 1874.

UNITED STATES PATENT OFFICE.

JAMES D. BREWER, OF MUNCY, PENNSYLVANIA.

IMPROVEMENT IN FISHWAYS.

Specification forming part of Letters Patent No. 154,216, dated August 18, 1874; application filed July 14, 1874.

*To all whom it may concern:*

Be it known that I, JAMES D. BREWER, of Muncy, in the county of Lycoming and State of Pennsylvania, have invented certain new and useful Improvements in Fishways; and I do hereby declare that the following is a full, clear, and exact description thereof, reference being had to the accompanying drawings, and to the letters of reference marked thereon, which form part of this specification.

The nature of my invention consists in the construction and arrangement of a fishway or chute, to facilitate the passage of the fish up stream, as will be hereinafter more fully set forth.

In order to enable others skilled in the art to which my invention appertains to make and use the same, I will now proceed to describe its construction and operation, referring to the annexed drawing, in which—

Figure 1:
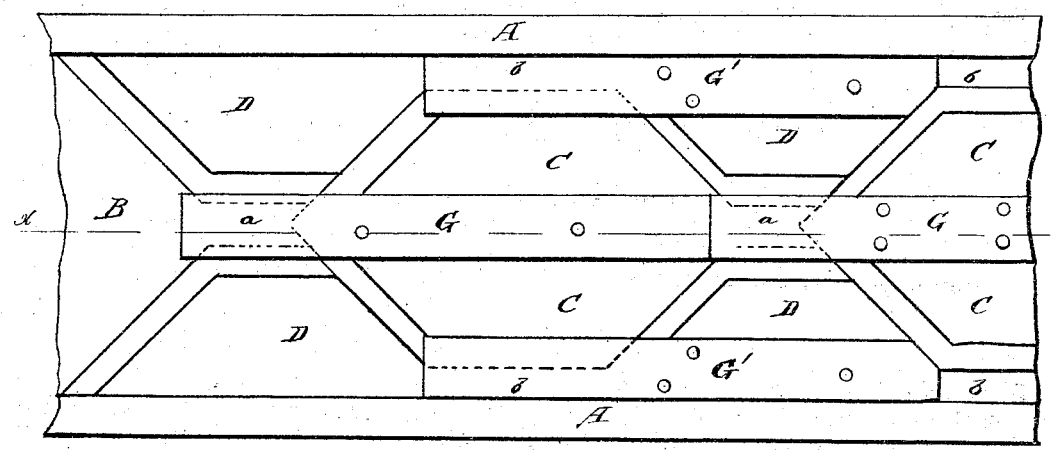
Figure 2:
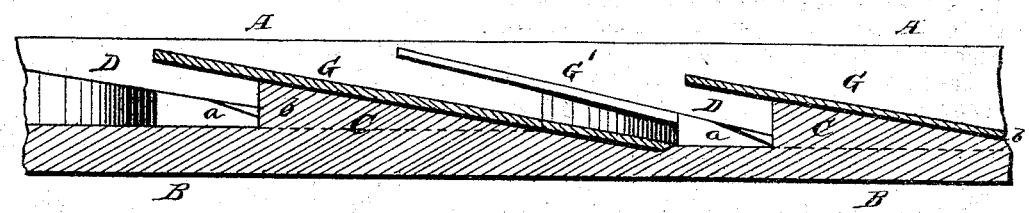

Figure 1 is a plan view; and Fig. 2, a central section on line $x$ $x$, Fig. 1.

A A represent the sides of my fishway or chute, and B the bottom thereof. On the bottom are formed alternate offsets C C and D D, the former inclining from the sides toward the center, and the latter from the center toward the sides. Between each set or pair of inclined offsets C C is formed a channel, $a$, leading up to and against the angle formed by the offsets D D, and at each side A, between it and the offset D, is a passage, $b$, leading up to the lower angle of the offset C, the whole thus forming a zigzag passage for the fish. In the center of top of the offsets D D is inlaid a board, G, which extends downward over the passage $a$ below them its entire length, and similar boards G' are inlaid into the offsets C C along the sides to cover the passages $b$ $b$, thereby forming protections for the fish in passing up through said passages, as the water will pass over said boards, and not come down with such force into said passages.

The fish, it will readily be seen, are, by this construction of the way or chute, protected during the entire passage through the same from the current of the water.

Having thus fully described my invention, what I claim as new, and desire to secure by Letters Patent, is—

1. The alternately-inclined offsets C C and D D, forming the passages $a$ and $b$ $b$, substantially as and for the purposes herein set forth.

2. The covering-boards G G', arranged above passages in the bottom of a fishway, substantially as and for the purposes herein set forth.

3. The combination of the alternately-inclined offsets C C and D D, and passages $a$ and $b$ $b$, with the covering-boards G G', substantially as and for the purposes herein set forth.

In testimony that I claim the foregoing as my own I affix my signature in presence of two witnesses.

JAMES D. BREWER.

Witnesses:
J. TYLER POWELL,
T. H. ALEXANDER.